United States Patent
Venkataraman Palani

(10) Patent No.: US 12,229,551 B2
(45) Date of Patent: Feb. 18, 2025

(54) DIGITAL TWIN AUTO-CODING ORCHESTRATOR

(71) Applicant: Bank of America Corporation, Charlotte, NC (US)

(72) Inventor: Karthik Rajan Venkataraman Palani, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 168 days.

(21) Appl. No.: 18/143,116

(22) Filed: May 4, 2023

(65) Prior Publication Data

US 2024/0370252 A1 Nov. 7, 2024

(51) Int. Cl.
*G06F 8/71* (2018.01)
*G06F 8/65* (2018.01)

(52) U.S. Cl.
CPC . *G06F 8/71* (2013.01); *G06F 8/65* (2013.01)

(58) Field of Classification Search
None
See application file for complete search history.

(56) References Cited

U.S. PATENT DOCUMENTS

| | | | |
|---|---|---|---|
| 9,256,509 B1* | 2/2016 | Rajagopal | G06F 11/008 |
| 9,659,251 B2 | 5/2017 | Tang et al. | |
| 10,067,876 B2 | 9/2018 | Bitincka et al. | |
| 10,979,516 B1 | 4/2021 | Giannetti et al. | |
| 11,200,045 B1* | 12/2021 | Moyal | G06F 11/3442 |
| 11,880,676 B1* | 1/2024 | Sandler | G06F 9/45558 |
| 2010/0332629 A1 | 12/2010 | Cotugno et al. | |
| 2016/0077816 A1* | 3/2016 | Eilam | G06F 8/65 717/177 |
| 2019/0149617 A1* | 5/2019 | Gao | H04L 67/34 709/223 |
| 2019/0391800 A1* | 12/2019 | Lin | G06F 8/65 |
| 2020/0174769 A1* | 6/2020 | Zolotow | G06F 8/65 |
| 2021/0034357 A1* | 2/2021 | Kesavan | G06F 11/1433 |
| 2021/0096543 A1* | 4/2021 | Stump | G06F 8/20 |
| 2021/0191694 A1* | 6/2021 | Maron | G06F 8/35 |
| 2021/0211349 A1* | 7/2021 | Grant | H04L 41/0866 |
| 2022/0269496 A1* | 8/2022 | Haldar | G06F 11/1433 |
| 2023/0087993 A1* | 3/2023 | Viswanathan | G06F 8/60 717/105 |
| 2023/0091293 A1* | 3/2023 | Duplys | G06F 11/302 726/25 |
| 2023/0107637 A1* | 4/2023 | Ghosh | G06N 5/04 717/169 |
| 2023/0266951 A1* | 8/2023 | Kholkar | G06F 8/77 717/154 |
| 2024/0354242 A1* | 10/2024 | Andress | G06F 11/3688 |

* cited by examiner

*Primary Examiner* — Andrew M. Lyons
(74) *Attorney, Agent, or Firm* — Weiss & Arons LLP

(57) ABSTRACT

Apparatus and methods to automatically create and implement update and migration workflows are provided. A digital twin auto-coding orchestrator may receive an updated version of a software program. The auto-coding orchestrator may gather infrastructure hardware data and version data. The auto-coding orchestrator may analyze the data. The auto-coding orchestrator may generate a workflow and code to update the older version to the updated version with the least amount of disruption and downtime. The auto-coding orchestrator may implement the workflow and update the software program to the updated version.

20 Claims, 6 Drawing Sheets

DIGITAL TWIN AUTO-CODING ORCHESTRATOR

FIELD OF TECHNOLOGY

Aspects of the disclosure relate to providing apparatus and methods to automatically generate and implement update and migration workflows and code to update and migrate software across a network.

BACKGROUND OF THE DISCLOSURE

Entities may include individuals, corporations, partnerships, non-profits, government agencies or branches, and other groups of people. Entities may be any size, including small (one member or employee) or large (thousands of employees or members). Entities may have an internal network. Entities may have one or more units of computer equipment, including servers, personal computers, and mobile computing devices.

Currently, an entity may have two or more instances of a service or software program across a network. These instances may be on multiple servers. These instances may be on a local hard drive or in the cloud. Often, the instances may be of multiple different versions of the same software, as not all instances may be updated at the same time. This may especially be true for a local instance of a program that is downloaded to a particular workstation and runs locally.

Currently, creating an efficient and standardized workflow to update and migrate services with different versions and in different locations may be a time-consuming and resource intensive task. In addition, migrating from one version of software to another (e.g., from a desktop version to a cloud version or from version 1.1 to version 1.2) may also lead to security and network issues and policy violations while trying to replicate the legacy version into the cloud, or updating other versions. Many projects only include initial design documentation which has less impact in connecting with the target state migration and its supporting functionalities and third-party dependencies.

Currently, there is no apparatus or method available to automatically generate deployment workflows and code while taking into account disparate versions and locations, with the least amount of disruption.

Therefore, it would be desirable for apparatus and methods to automatically create and implement update and migration workflows and code.

SUMMARY OF THE DISCLOSURE

It is an object of this disclosure to provide apparatus and methods to automatically create and implement update and migration workflows using a digital twin auto-coding orchestrator.

A digital twin auto-coding orchestrator computer program product is provided. The computer program product may include executable instructions. The executable instructions may be stored in non-transitory memory and be executed by a processor on a computer system.

The instructions may receive an updated version of a software program. An older version of the software program may be installed on the computer system.

The instructions may gather two or more quanta of data from the computer system. The data may include infrastructure data and older version data.

The infrastructure data may include hardware data including performance, volume, and load capacity, and data on all software installed on the computer system, including performance data, memory utilization, processor utilization, and process runtimes for all software.

Older version data may include version history, performance data, memory utilization, processor utilization, and process runtime for each process within the older version.

The instructions may record the two or more quanta of data in a database.

The instructions may analyze the two or more quanta of data, create a digital twin of the computer system using the two or more quanta of data, automatically generate a proposed workflow to update the older version to the updated version, and automatically generate machine-readable code to implement the proposed workflow. The proposed workflow may include one or more discrete tasks to install the updated version in a set order to minimize downtime and disruption The instructions may test the proposed workflow and the machine-readable code on the digital twin and revise the proposed workflow and machine-readable code based on the test.

In an embodiment, the computer system may be on a network.

In an embodiment, the executable instructions may also search the network for one or more additional computer systems where the older version of the software program is installed on the one or more additional computer systems.

In an embodiment, when the one or more additional computer systems are discovered, the instructions may install a copy of the digital twin auto-coding orchestrator computer program product on each additional computer system where the older version is installed, creating an original digital twin and one or more copied digital twins.

In an embodiment, when the instructions install the one or more copied digital twins, each copy records two or more quanta of data in the same database available to the original digital twin.

In an embodiment, the original digital twin may analyze all data in the database.

In an embodiment, the proposed workflow may minimize downtime and disruption for: the computer system, the network, and the one or more additional computer systems.

In an embodiment, the analysis may use one or more artificial intelligence/machine learning ("AI/ML") algorithms.

In an embodiment, the proposed workflow may be generated by one or more artificial intelligence/machine learning ("AI/ML") algorithms.

In an embodiment, the machine-readable code may be generated by one or more artificial intelligence/machine learning ("AI/ML") algorithms.

In an embodiment, the instructions may implement the proposed workflow.

In an embodiment, the instructions may implement the proposed workflow using the machine-readable code.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
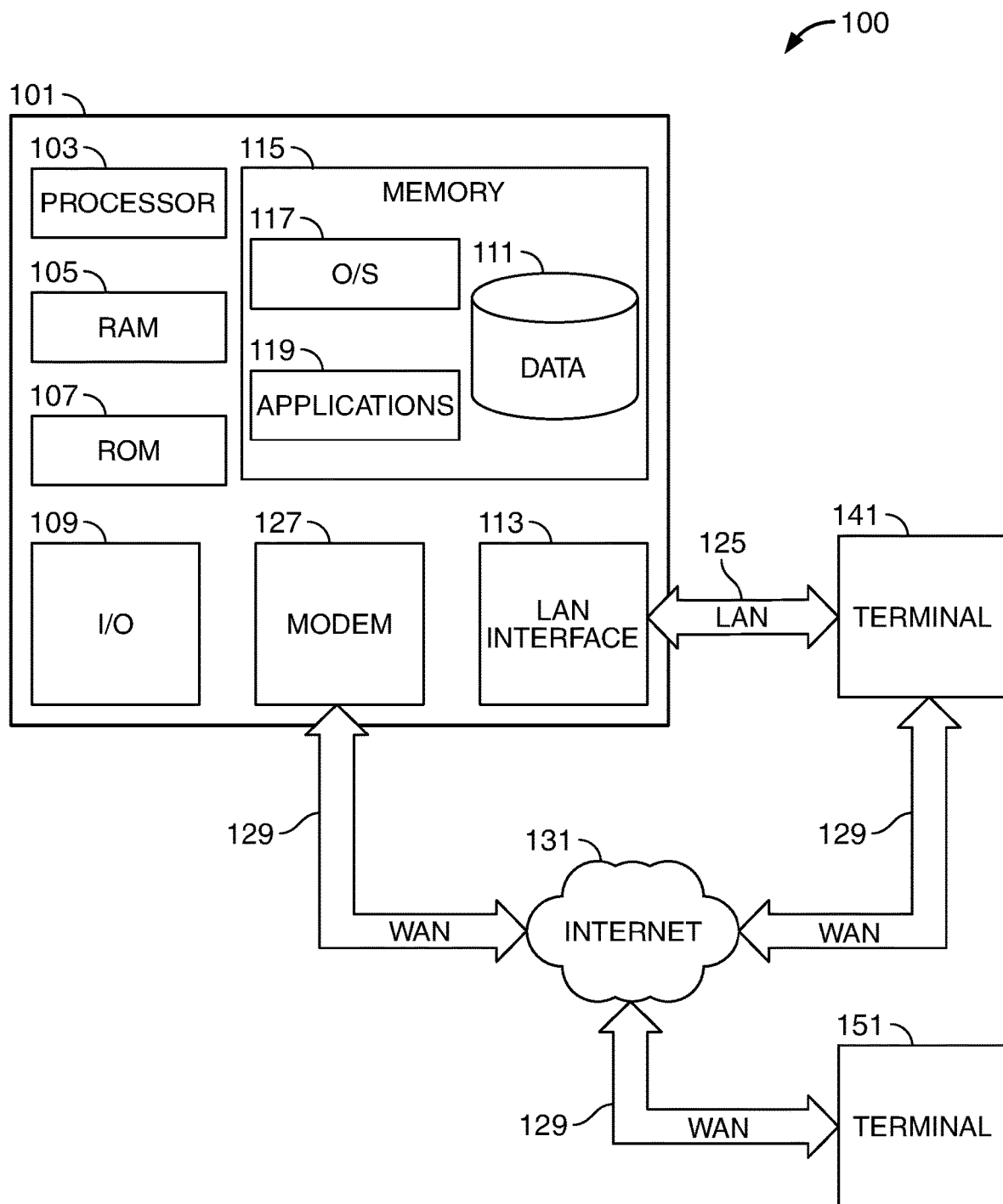
FIG. 1 shows an illustrative apparatus in accordance with principles of the disclosure.

It is an object of this disclosure to provide apparatus and methods to automatically create and implement update and migration workflows and code using a digital twin auto-coding orchestrator.

A digital twin auto-coding orchestrator computer program product is provided. The computer program product may include executable instructions. The executable instructions may be stored in non-transitory memory and be executed by a processor on a computer system.

Multiple processors may increase the speed and capability of the program. The executable instructions may be stored in non-transitory memory on the computer system or a remote computer system, such as a server.

Other standard components of a computer system may be present. The computer system may be a server, mobile device, or other type of computer system. A server or more powerful computer may increase the speed at which the computer program may run. Portable computing devices, such as a smartphone, laptop or tablet, may increase the portability and usability of the computer program, but may not be as secure or as powerful as a server or desktop computer.

The term "non-transitory memory," as used in this disclosure, is a limitation of the medium itself, i.e., it is a tangible medium and not a signal, as opposed to a limitation on data storage types (e.g., RAM vs. ROM). "Non-transitory memory" may include both RAM and ROM, as well as other types of memory.

The computer may include, among other components, a communication link, a processor or processors, and a non-transitory memory configured to store executable data configured to run on the processor. The executable data may include an operating system and the digital twin auto-coding orchestrator computer program.

A processor or processors may control the operation of the computer system and its components, which may include RAM, ROM, an input/output module, and other memory. The microprocessor(s) may also execute all software running on the apparatus and computer system. Other components commonly used for computers, such as EEPROM or Flash memory or any other suitable components, may also be part of the apparatus and computer system.

A communication link may enable communication with other computers as well as any server or servers. The communication link may include any necessary hardware (e.g., antennae) and software to control the link. Any appropriate communication link may be used, such as Wi-Fi, bluetooth, LAN, and cellular links. In an embodiment, the network used may be the Internet. In another embodiment, the network may be an internal intranet or other network.

The computer system may be a server. The computer program may be run on a smart mobile device. The computer program, or portions of the computer program may be linked to other computers or servers running the computer program. The server or servers may be centralized or distributed. Centralized servers may be more powerful and secure than distributed servers but may also be more expensive and less resilient.

The instructions may receive an updated version of a software program. The updated version may be received from another computer, a network location, a physical medium (such as a hard drive, USB drive, CD-ROM etc.), and may be transmitted by a computer or a person, such as a system administrator. For example, a system administrator may upload the updated version. The updated version may be received in response to a release by a developer. For example, a developer may release the updated version and announce the update via email or other communication method. The announcement may include the update or a link to the update. The orchestrator program may receive the announcement and retrieve the update. Alternatively, a program may automatically receive and download an update, depending on configuration settings.

In an embodiment, an entity may migrate from one computer program to another, or from one platform to another (such as local to the cloud). The digital twin auto-coding orchestrator may perform the same or similar functions for migration of programs as for updating a program.

In an embodiment, the instructions may automatically search a network, such as the Internet, for an updated version of the software program. The search may be constant. The search may be at predetermined intervals, such as every week or every 30 days.

An older version of the software program may be installed on the computer system. For example, version 1, and the updated version may be version 1.1.

The instructions may automatically gather two or more quanta of data from the computer system. The data may include infrastructure data and older version data. The program may gather the data by retrieving logs, system data, software program data, metadata, searching a network, or other methods. In an embodiment, a system administrator may provide some or all of the data.

The infrastructure data may include hardware data. Hardware data may include model of the computer system along with system specifications, such as RAM, CPU, storage size, storage remaining, and other hardware specifications. Hardware data may include performance, volume, and load capacity of each separate piece of hardware and the system as a whole. Infrastructure data may also include data on some or all software installed on the computer system, including performance data, memory utilization, processor utilization, and process runtimes for the software analyzed.

In an embodiment, the digital twin computer program may determine which installed software it needs data for, by analyzing multiple factors, such as type and purpose of the software, how much memory or how many CPU processes the software is utilizing, access to the software, as well as other factors.

Older version data may include version history, performance data, memory utilization, processor utilization, and process runtime for each process within the older version of the specific software that the digital twin program has received an updated version for.

The digital twin program may analyze and use this data to perform its functions. The more data gathered, the more accurate and robust the digital twin program may be.

The instructions may record the two or more quanta of data in a database. The database may be located at the computer system. The database may be located remotely from the computer system. The database may be located at or near the computer system with the computer program. The database may be located remotely from the computer system with the computer program. The database may be accessed over an internal or external network.

In an embodiment, the database may be distributed across multiple computer systems or servers. The distributed systems or servers may be geographically distant.

In an embodiment, the database may be encrypted. Encrypting the database may be required depending on the sensitivity of the network or computer systems. Any appropriate encryption protocol or method may be used.

The instructions may analyze the two or more quanta of data to create a digital twin of the computer system using the two or more quanta of data, as well as perform any other function. The instructions may analyze the data through any appropriate method, including artificial intelligence/machine learning algorithms.

A digital twin may be an exact, but virtual, copy of the computer system, to model and test code and other programs. A digital twin may be a virtual representation of computer system. For example, a digital twin may virtually model each of the 100 (or 'n') threads available in a particular CPU, along with free RAM, to determine how many threads would be used during an update of the older version. For example, if the computer system (i.e., all of the software already installed) is using 95/100 of the threads or processes in a CPU before any update, along with 3 out of the 4 gb of RAM available, the digital twin will reflect the used and available processes and memory available, along with all other monitored parameters (network bandwidth, storage available, etc.).

The instructions may automatically generate a proposed workflow to update the older version to the updated version. The proposed workflow may include one or more discrete tasks to install the updated version in a set order to minimize downtime and disruption. For example, the instructions may determine that programs a, b, and c should be ended or stopped, programs d and e should be paused, and programs f through t should not be disturbed, before updating the older version. The instructions may calculate, for example, that if this workflow is followed, the computer system may be down for ten minutes, but if programs a and b are not stopped, the system may be down for twenty minutes.

A goal and purpose of the proposed workflow may be to produce the workflow that may have the least anticipated downtime and disruption of the computer system. Reducing downtime and disruption may be advantageous in multiple ways, including saving time and money for an individual or entity.

The instructions may automatically generate machine-readable code to implement the proposed workflow. The machine-readable code may be in any programming language. The machine-readable code may be a script. The machine-readable code may be a more involved executable program. For example, the machine-readable code may be a script that, (in pseudo-code) does the following:

```
Start
    Cancel program "a";
    Cancel program "b";
    Cancel program "c";
    Pause program "d";
    Pause program "e";
    Install updated version;
    Restart program "a";
    Restart program "b";
    Restart program "c";
```

-continued

```
    Continue program "d";
    Continue program "e";
End
```

The instructions may test the proposed workflow and the machine-readable code on the digital twin and revise the proposed workflow and machine-readable code based on the test. For example, if the proposed workflow proposes closing five applications to free up X processes and Y memory, the instructions may test to determine if closing those five applications will free up X processes and Y memory, or a different number. The instructions may also test if closing those applications or other proposed actions will disrupt the computer system or network, and how long it may take to install. The instructions may also test if the generated code performs as expected.

In an embodiment, the computer system may be on a network. The network may be internal or external.

In an embodiment, when the computer system is on a network, the executable instructions may search the network for one or more additional computer systems where the older version of the software program is installed on the one or more additional computer systems. For example, the computer system may be one of ten computers on an internal network. Six of those computers may have an older version of the software program installed. The instructions may search the available data on each additional computer system to determine if an older version is installed or not.

In an embodiment, the search may be continuous. In an embodiment, the search may occur at predetermined intervals (e.g., every hour, every day, every 10 days, etc.). The pre-determined intervals may be adjusted manually (e.g., by a system administrator) or automatically by the program.

In an embodiment, when the one or more additional computer systems are discovered, the instructions may install a copy of the digital twin auto-coding orchestrator computer program product on each additional computer system where the older version is installed. The auto-coding orchestrator program may only be installed on each additional computer system that includes an older version of the software program that is being updated. This may create an original digital twin program and one or more copied digital twin programs.

In an embodiment, when the instructions install the one or more copied digital twins, each copy records two or more quanta of data in the same database available to the original digital twin. The two or more quanta of data may be the same type(s) of data recorded by the original digital twin. Recording all of the data in the same database may allow for more robust analysis as well as creation of code and designing of more efficient workflow(s).

In an embodiment, the original digital twin may analyze all data in the database. In this embodiment, one digital twin, either the original or a copy, may perform the required analysis. Having only one digital twin perform the analysis (and other steps) may increase efficiency and reduce redundancies. The group of digital twins may automatically determine which digital twin should perform the analysis. The group may determine and assign the analysis to the digital twin on the most powerful computer system, the computer system with the most available resources, or other factors. Alternatively, the analysis may always be performed by the original digital twin.

In an embodiment, the analysis (and other steps) may be performed by all computer systems that include a digital twin. The analysis may be distributed amongst part or all of the computer systems. Performing distributed calculation may increase efficiency and the computing resources available to perform calculations, as no single computer systems may be as powerful as a group of distributed computer systems.

In an embodiment, the proposed workflow may be formulated to minimize downtime and disruption for: the computer system, the network, and the one or more additional computer systems. For example, if 10 computer systems on a network of 20 computer systems need to have software upgraded from the original version to an updated version, the proposed workflow may be designed to minimize downtime and disruption for the network as a whole, all 20 computers on the network, as well as the ten computers with the software. For example, the ten computers may need to be restarted, but doing so may prevent those ten computers from performing other functions for the network. The proposed workflow may decide to stagger the restarts, so only one of the twenty computers is down and unavailable at any one time.

In an embodiment, the analysis may use one or more artificial intelligence/machine learning ("AI/ML") algorithms. Any suitable AI/ML algorithms may be used. Each algorithm may dynamically evaluate one or more factors in its analysis. The algorithm(s) may iterate. The algorithm(s) may be trained on a training set of data. The training set may be created data or actual data. The algorithms may be checked by one or more system administrators.

In an embodiment, the proposed workflow may be generated by one or more artificial intelligence/machine learning ("AI/ML") algorithms. Any suitable AI/ML algorithms may be used. Each algorithm may dynamically evaluate one or more factors in its analysis. The algorithm(s) may iterate. The algorithm(s) may be trained on a training set of data. The training set may be created data or actual data. The algorithms may be checked by one or more system administrators.

In an embodiment, the machine-readable code may be generated by one or more artificial intelligence/machine learning ("AI/ML") algorithms. Any suitable AI/ML algorithms may be used. Each algorithm may dynamically evaluate one or more factors in its analysis. The algorithm(s) may iterate. The algorithm(s) may be trained on a training set of data. The training set may be created data or actual data. The algorithms may be checked by one or more system administrators.

The instructions may analyze all of the data. The analysis may include evaluating system requirements, program requirements, system resources, network requirements, business and use requirements, time requirements, a pre-determined maximum allowable downtime, a calculated maximum allowable downtime, potential disruption to users or other computers, as well as other factors.

Each factor may be analyzed on a scale. The scale may be of any type. For example, the scale may be a number from 0 through 10, with 10 being most likely to cause disruption and 0 being least likely to cause disruption. The scale may be adjusted dynamically by the program. The scale may be adjusted manually.

In an embodiment, the instructions may implement the proposed workflow. For example, if the proposed workflow is to pause applications a and b, cancel applications c and d, and restart the computer system, using script/code generated, the instructions may automatically implement every step of the proposed workflow. The implementation may be at a set time, immediately, or after confirmation from a system administrator.

In an embodiment, the instructions may implement the proposed workflow using the machine-readable code or other code. Using the machine-readable code generated by the instructions may save time and be more efficient than using other code.

An apparatus for a digital twin auto-coding orchestrator is provided. The apparatus may include a central server and one or more network nodes.

The central server may include a server communication link, a server processor, and a serve non-transitory memory. The server non-transitory memory may be configured to store at least: a server operating system, and a server digital twin auto-coding orchestrator application.

Each network node may include a node communication link, a node processor, and a node non-transitory memory. The node non-transitory memory may be configured to store at least: a node operating system and an older version of a software program.

When the server digital twin auto-coding orchestrator receives an updated version of the software program, the digital twin auto-coding orchestrator ("DTACO") may identify each of the one or more network nodes. The DTACO may gather two or more quanta of data from each of the one or more network nodes. The data may include infrastructure data and older version data.

The DTACO may record the two or more quanta of data in a database, analyze the two or more quanta of data, and create a digital twin of each of the one or more network nodes using the two or more quanta of data.

The DTACO may automatically generate a proposed workflow to update the older version to the updated version and automatically generate machine-readable code to implement the proposed workflow.

The DTACO may test the proposed workflow and the machine-readable code on the digital twin and revise the proposed workflow and machine-readable code based on the test, generating a revised workflow and revised machine-readable code.

In an embodiment, the digital twin auto-coding orchestrator may implement the revised workflow.

In an embodiment, the digital twin auto-coding orchestrator may implement the revised workflow using the revised machine-readable code.

In an embodiment, the digital twin auto-coding orchestrator may transmit the revised workflow and the revised machine-readable code to a system administrator.

In an embodiment, the digital twin auto-coding orchestrator may revise the proposed workflow to a pre-determined condition.

In an embodiment, the digital twin auto-coding orchestrator may revise the machine-readable code to a pre-determined condition.

In an embodiment, the digital twin auto-coding orchestrator may automatically update the older version of the software program to the updated version on each of the one or more nodes.

A method for updating a software program using a digital twin auto-coding orchestrator is provided. The method may include the step of receiving, at the digital twin auto-coding orchestrator, an updated version of the software program.

The method may include the step of querying each node of a network to determine which one or more nodes includes an older version of the software program.

The method may include the step of identifying which node of the one or more network nodes includes an older version of the software program.

The method may include the step of gathering two or more quanta of data from each node of the one or more network nodes that include an older version of the software program. The data may include infrastructure data and older version data, The method may include the step of recording the two or more quanta of data in a database.

The method may include the step of analyzing the two or more quanta of data.

The method may include the step of creating a digital twin of each node of the one or more network nodes that includes an older version of the software program using the two or more quanta of data.

The method may include the step of automatically generating a proposed workflow to update the older version to the updated version.

The method may include the step of automatically generating machine-readable code to implement the proposed workflow.

The method may include the step of testing the proposed workflow and the machine-readable code on the digital twin and revising the proposed workflow and machine-readable code based on the test, to generate a revised workflow and revised machine-readable code.

One of ordinary skill in the art will appreciate that the steps shown and described herein may be performed in other than the recited order and that one or more steps illustrated may be optional. Apparatus and methods may involve the use of any suitable combination of elements, components, method steps, computer-executable instructions, or computer-readable data structures disclosed herein.

Illustrative embodiments of apparatus and methods in accordance with the principles of the invention will now be described with reference to the accompanying drawings, which form a part hereof. It is to be understood that other embodiments may be utilized, and that structural, functional, and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

In accordance with principles of the disclosure, FIG. 1 shows an illustrative block diagram of apparatus 100 that includes a computer 101. Computer 101 may alternatively be referred to herein as a "computing device." Elements of apparatus 100, including computer 101, may be used to implement various aspects of the apparatus and methods disclosed herein. A "user" of apparatus 100 or computer 101 may include other computer systems or servers or computing devices, such as the program described herein.

Computer 101 may have one or more processors/microprocessors 103 for controlling the operation of the device and its associated components, and may include RAM 105, ROM 107, input/output module 109, and a memory 115. The microprocessors 103 may also execute all software running on the computer 101—e.g., the operating system 117 and applications 119 such as a digital twin auto-coding orchestrator and security protocols. Other components commonly used for computers, such as EEPROM or Flash memory or any other suitable components, may also be part of the computer 101.

The memory 115 may be comprised of any suitable permanent storage technology—e.g., a hard drive or other non-transitory memory. The ROM 107 and RAM 105 may be included as all or part of memory 115. The memory 115 may store software including the operating system 117 and application(s) 119 (such as a digital twin auto-coding orchestrator and security protocols) along with any other data 111 (e.g., historical data, configuration file) needed for the operation of the apparatus 100. Memory 115 may also store applications and data. Alternatively, some or all of computer executable instructions (alternatively referred to as "code") may be embodied in hardware or firmware (not shown). The microprocessor 103 may execute the instructions embodied by the software and code to perform various functions.

The network connections/communication link may include a local area network (LAN) and a wide area network (WAN or the Internet) and may also include other types of networks. When used in a WAN networking environment, the apparatus may include a modem or other means for establishing communications over the WAN or LAN. The modem and/or a LAN interface may connect to a network via an antenna. The antenna may be configured to operate over Bluetooth, wi-fi, cellular networks, or other suitable frequencies.

Any memory may be comprised of any suitable permanent storage technology—e.g., a hard drive or other non-transitory memory. The memory may store software including an operating system and any application(s) (such as a digital twin auto-coding orchestrator and security protocols) along with any data needed for the operation of the apparatus and to allow bot monitoring and IoT device notification. The data may also be stored in cache memory, or any other suitable memory.

An input/output ("I/O") module 109 may include connectivity to a button and a display. The input/output module may also include one or more speakers for providing audio output and a video display device, such as an LED screen and/or touchscreen, for providing textual, audio, audiovisual, and/or graphical output.

In an embodiment of the computer 101, the microprocessor 103 may execute the instructions in all or some of the operating system 117, any applications 119 in the memory 115, any other code necessary to perform the functions in this disclosure, and any other code embodied in hardware or firmware (not shown).

In an embodiment, apparatus 100 may consist of multiple computers 101, along with other devices. A computer 101 may be a mobile computing device such as a smartphone or tablet.

Apparatus 100 may be connected to other systems, computers, servers, devices, and/or the Internet 131 via a local area network (LAN) interface 113.

Apparatus 100 may operate in a networked environment supporting connections to one or more remote computers and servers, such as terminals 141 and 151, including, in general, the Internet and "cloud". References to the "cloud" in this disclosure generally refer to the Internet, which is a world-wide network. "Cloud-based applications" generally refer to applications located on a server remote from a user, wherein some or all of the application data, logic, and instructions are located on the internet and are not located on a user's local device. Cloud-based applications may be accessed via any type of internet connection (e.g., cellular or wi-fi).

Terminals 141 and 151 may be personal computers, smart mobile devices, smartphones, IoT devices, or servers that include many or all of the elements described above relative to apparatus 100. The network connections depicted in FIG. 1 include a local area network (LAN) 125 and a wide area network (WAN) 129 but may also include other networks. Computer 101 may include a network interface controller (not shown), which may include a modem 127 and LAN interface or adapter 113, as well as other components and adapters (not shown). When used in a LAN networking environment, computer 101 is connected to LAN 125 through a LAN interface or adapter 113. When used in a WAN networking environment, computer 101 may include a modem 127 or other means for establishing communications over WAN 129, such as Internet 131. The modem 127 and/or LAN interface 113 may connect to a network via an antenna (not shown). The antenna may be configured to operate over Bluetooth, wi-fi, cellular networks, or other suitable frequencies.

It will be appreciated that the network connections shown are illustrative and other means of establishing a communications link between computers may be used. The existence of various well-known protocols such as TCP/IP, Ethernet, FTP, HTTP, and the like is presumed, and the system can be operated in a client-server configuration. The computer may transmit data to any other suitable computer system. The computer may also send computer-readable instructions, together with the data, to any suitable computer system. The computer-readable instructions may be to store the data in cache memory, the hard drive, secondary memory, or any other suitable memory.

Application program(s) 119 (which may be alternatively referred to herein as "plugins," "applications," or "apps") may include computer executable instructions for a digital twin auto-coding orchestrator and security protocols, as well as other programs. In an embodiment, one or more programs, or aspects of a program, may use one or more AI/ML algorithm(s). The various tasks may be related to gathering and analyzing correspondence files and generating a correspondence plan to incentivize paperless transaction and communication adoption.

Computer 101 may also include various other components, such as a battery (not shown), speaker (not shown), a network interface controller (not shown), and/or antennas (not shown).

Terminal 151 and/or terminal 141 may be portable devices such as a laptop, cell phone, tablet, smartphone, server, or any other suitable device for receiving, storing, transmitting and/or displaying relevant information. Terminal 151 and/or terminal 141 may be other devices such as remote computers or servers. The terminals 151 and/or 141 may be computers where a user is interacting with an application.

Any information described above in connection with data 111, and any other suitable information, may be stored in memory 115. One or more of applications 119 may include one or more algorithms that may be used to implement features of the disclosure, and/or any other suitable tasks.

In various embodiments, the invention may be operational with numerous other general purpose or special purpose computing system environments or configurations. Examples of well-known computing systems, environments, and/or configurations that may be suitable for use with the invention in certain embodiments include, but are not limited to, personal computers, servers, hand-held or laptop devices, tablets, mobile phones, smart phones, other Computers, and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, IoT devices, and the like.

Aspects of the invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network, e.g., cloud-based applications. In a distributed computing environment, program modules may be located in both local and remote computer storage media including memory storage devices.

Figure 2:
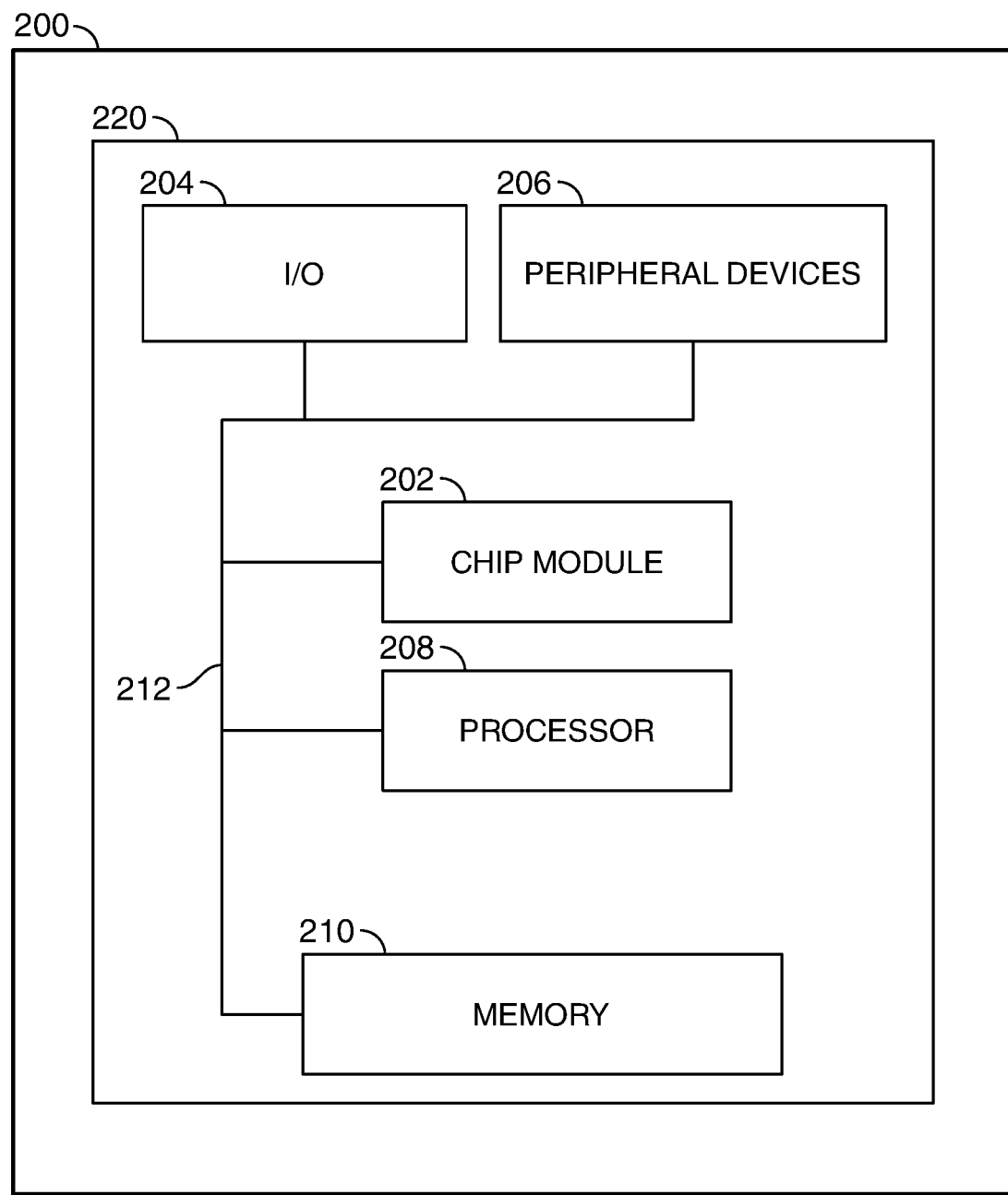
FIG. 2 shows an illustrative apparatus in accordance with principles of the disclosure.

FIG. 2 shows illustrative apparatus 200 that may be configured in accordance with the principles of the disclosure. Apparatus 200 may be a server or computer with various peripheral devices 206. Apparatus 200 may include one or more features of the apparatus shown in FIGS. 1-6. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device, an display (LCD, LED, OLED, etc.), a touchscreen or any other suitable media or devices; peripheral devices 206, which may include other computers; logical processing device 208, which may compute data information and structural parameters of various applications; and machine-readable memory 210.

Machine-readable memory 210 may be configured to store in machine-readable data structures: machine executable instructions (which may be alternatively referred to herein as "computer instructions" or "computer code"), applications, signals, recorded data, and/or any other suitable information or data structures. The instructions and data may be encrypted.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
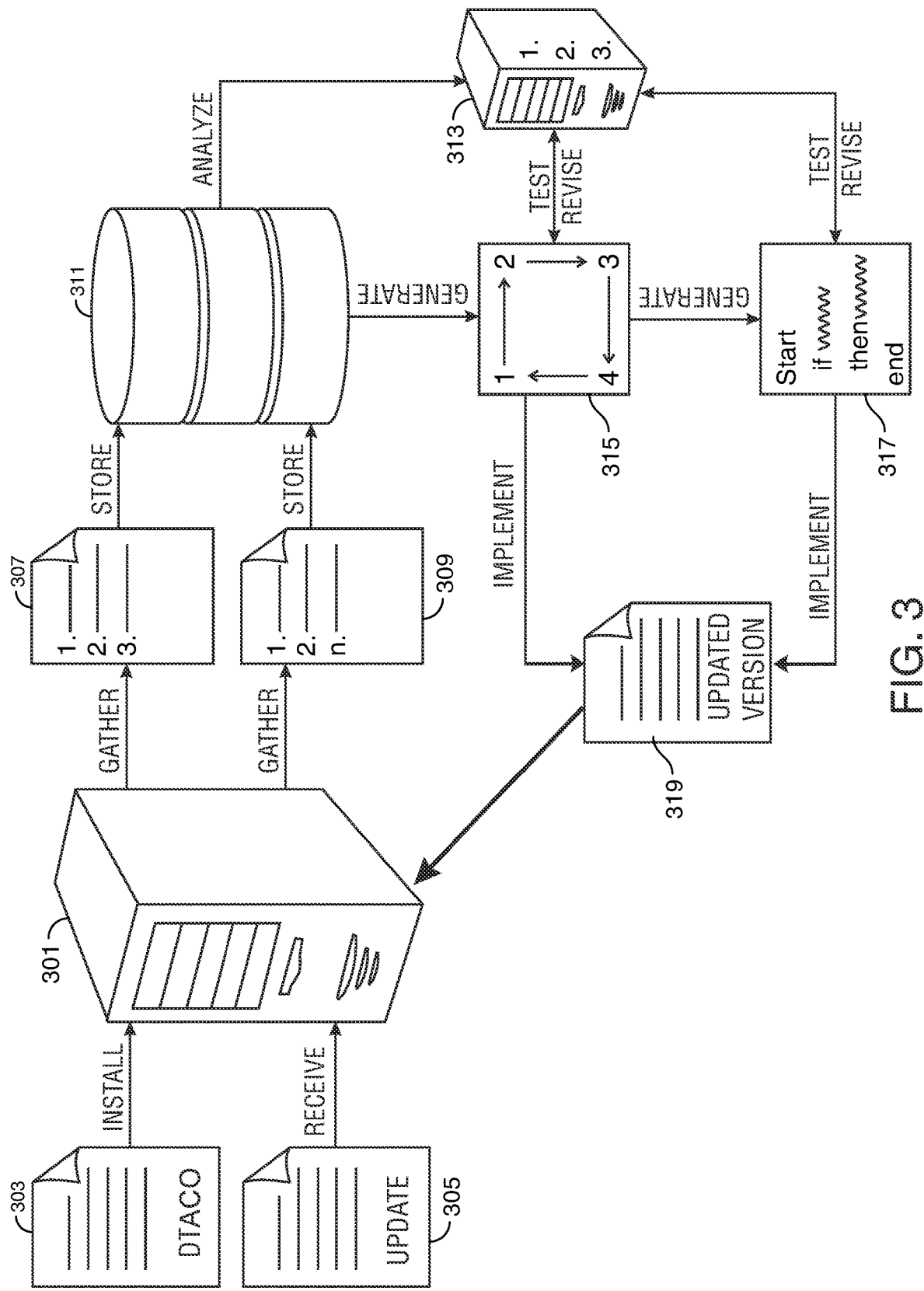
FIG. 3 shows an illustrative schematic in accordance with principles of the disclosure.

FIG. 3 shows an illustrative schematic in accordance with principles of the disclosure. Apparatus may include any of the components and systems odd-numbered 301 through 319, among other components, as well as steps labeled on FIG. 3. Steps may be performed on the apparatus shown in FIGS. 1-4, and 6 or other apparatus shown in other figures or described elsewhere A computer system 301 that has a digital twin auto-coding orchestrator ("DTACO") 303 installed, and an older version of a software program, may receive an updated version 305 of the software program.

The DTACO 303 may gather infrastructure data 307 and older version data 309.

The DTACO 303 may store the infrastructure data 307 and older version data 309 in a database 311.

The DTACO 303 may analyze the data 307 and 309 to create a digital twin 313 of the computer system 301.

The DTACO 303 may generate a proposed workflow 315 and machine-readable code 317 to implement the proposed workflow 315.

The DTACO 303 may test the proposed workflow 315 and code 317 on the digital twin 313.

Based on results of the test, the DTACO 303 may revise the proposed workflow 315 and code 317.

Once the proposed workflow 315 and code 317 reduce the downtime and disruption of updating or migrating the software program through update 305 to a pre-determined or other (to be determined) level of downtime and disruption, the DTACO 303 may install the update or perform the migration, leaving an updated version 319 on the computer system 301.

Figure 4:
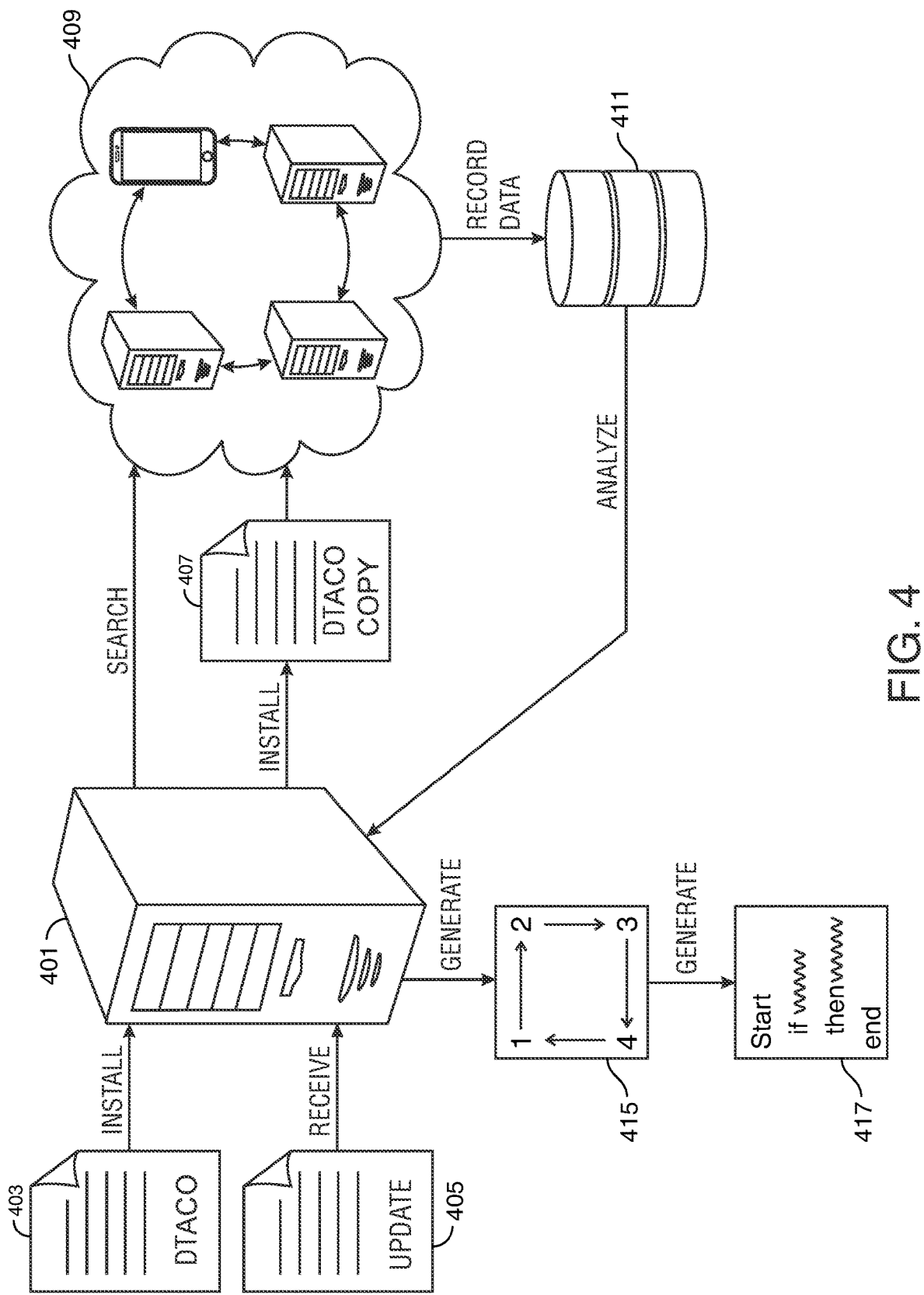
FIG. 4 shows an illustrative schematic in accordance with principles of the disclosure.

FIG. 4 shows an illustrative schematic in accordance with principles of the disclosure. Apparatus may include any of the components and systems odd-numbered 401 through 417, among other components, as well as steps labeled on FIG. 4. Steps may be performed on the apparatus shown in FIGS. 1-4, and 6 or other apparatus shown in other figures or described elsewhere.

A computer system 401 that has a digital twin auto-coding orchestrator ("DTACO") 403 installed, and an older version of a software program, may receive an updated version 405 of the software program.

The DTACO 403 may search a network 409 for nodes on the network that include older version(s) of the software program.

The DTACO 403 may install copies 407 of itself on each node of the network that includes an older version of the software program.

The DTACO 403 or 407 may gather infrastructure data and older version data for each node and record that data in a database 411.

The DTACO 403 or, in an embodiment, 407, may analyze the data to automatically generate a proposed workflow 415 and machine-readable code 417 to implement the proposed workflow 415.

The DTACO 403 or, in an embodiment, 407, may test the proposed workflow 415 and code 417 on one or more digital twins.

Based on results of the test, the DTACO 403 or, in an embodiment, 407, may revise the proposed workflow 415 and code 417.

Once the proposed workflow 415 and code 417 reduce the downtime and disruption of updating or migrating the software program through update 305 to a pre-determined or other (to be determined) level of downtime and disruption for each node and the network as whole, the DTACO 403 or, in an embodiment, 407, may install the update or perform the migration, leaving an updated or migrated version on each node.

Figure 5:
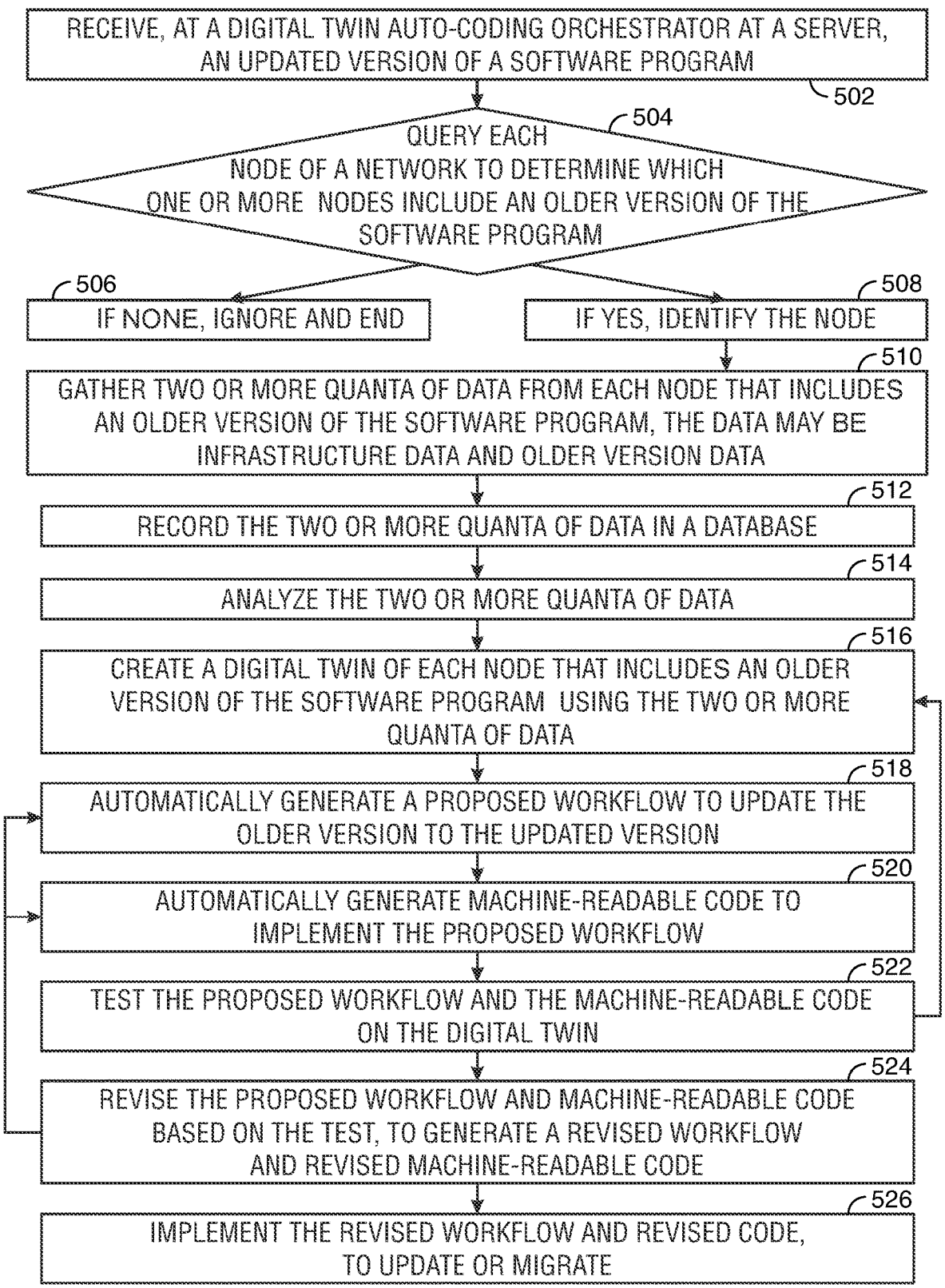
FIG. 5 shows an illustrative flowchart in accordance with principles of the disclosure.

FIG. 5 shows an illustrative flowchart in accordance with principles of the disclosure. Methods may include some or all of the method steps numbered 502 through 526. Methods may include the steps illustrated in FIG. 5 in an order different from the illustrated order. The illustrative method shown in FIG. 5 may include one or more steps performed in other figures or described herein. Steps 502 through 526 may be performed on the apparatus shown in FIGS. 1-4, 6 or other apparatus.

At step 502, a digital twin auto-coding orchestrator ("DTACO"), which may be located at a centralized or decentralized server, or other computer system, may receive an update version of a software program. The updated version may be transmitted from a developer, a system administrator, a hardware storage medium, retrieved from a network location (including the Internet), or automatically retrieved from a network location.

At step 504, the DTACO may query each node of a network to determine which one or more nodes on the network may include an older version of the software program that may need to be updated.

At step 506, if a node does not include an older version of the software program, the DTACO may end its program with respect to that node.

At step 508, if a node does include an older version of the software program, the DTACO may identify the node, including IP address, hardware addresses, ports, and other data.

At step 510, the DTACO may gather two or more quanta of data from each node identified in step 508. The data may include infrastructure data and older version data, as well as other data necessary for the DTACO to perform its functions.

At step 512, the DTACO may record the two or more quanta of data in a database. The database may be located at the same location as the DTACO, or at a remote location. The database may be centralized or distributed.

At step 514, the DTACO may analyze the two or more quanta of data.

At step 516, the DTACO may create a digital twin of each node that includes an older version of the software program. The digital twin may be created through the analysis of the data at step 514.

At step 518, the DTACO may automatically generate a proposed workflow to update the older version of the software to the updated version. The proposed workflow may be optimized to reduce the disruption and downtime of the network and each node.

At step 520, the DTACO may automatically generate machine-readable and implementable code designed to implement the proposed workflow.

At step 522, the DTACO may test the proposed workflow and machine-readable code on the digital twin created at step 516.

At step 524, the DTACO may revise the proposed workflow and machine-readable code based on the test at step 522. The revision may generate a revised workflow and revised machine-readable code.

The revision and test may iterate until the proposed workflow (and code) update or migrate the software at a pre-determined or determinable level of disruption and downtime.

At step 526, the DTACO may automatically implement the revised workflow and revised code, to update or migrate the software program.

Figure 6:
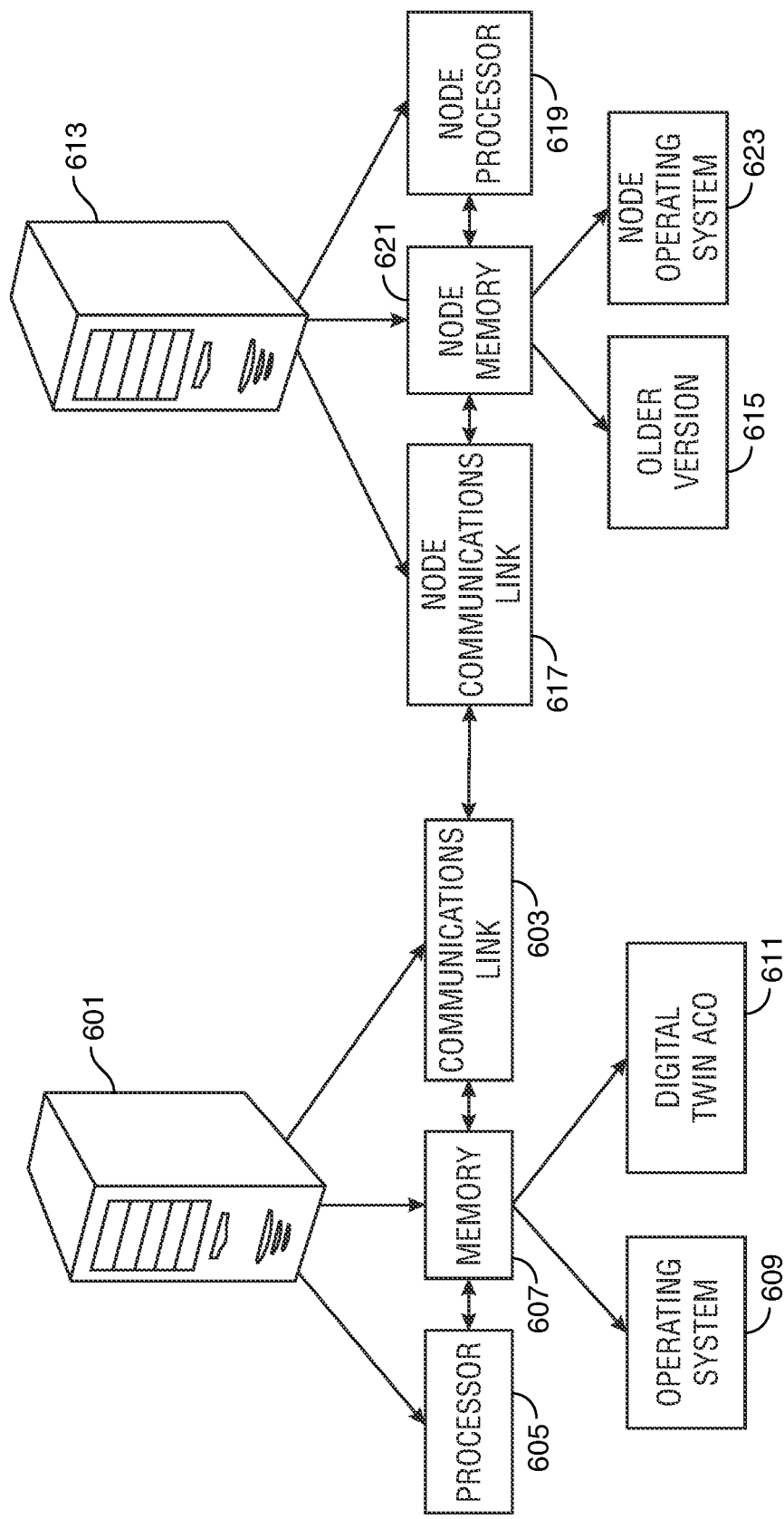
FIG. 6 shows an illustrative apparatus in accordance with principles of the disclosure.

FIG. 6 shows an illustrative apparatus in accordance with principles of the disclosure. The apparatus may include a central server 601 and one or more network nodes 613.

The central server 601 may include a server communications link 603, a server processor/processors 605, and a server non-transitory memory 607, as well as other components.

Network node 613 may include a node communications link 617, a node processor or processors 619, and a node non-transitory memory 621.

The server non-transitory memory 607 may include a server operating system 609, a digital twin auto-coding orchestrator application 611, as well as other data and programs.

The server communications link 603 may communicate with each node 613 (as well as other servers/computers, not shown). The digital twin auto-coding orchestrator 611 may communicate with all nodes 613 through the server communications link 603.

The node non-transitory memory 621 may include a node operating system 623, and an older version of a software program 615.

When the server digital twin auto-coding orchestrator 611 receives an updated version of the software program (from an administrator, a network location, a physical storage medium etc.), the server digital twin auto-coding orchestrator 611 may identify each of the one or more network nodes.

The server digital twin auto-coding orchestrator 611 may gather two or more quanta of data from each of the one or more network nodes 613. The data may include infrastructure data and older version data.

The server digital twin auto-coding orchestrator 611 may record the two or more quanta of data in a database (not shown).

The server digital twin auto-coding orchestrator 611 may analyze the two or more quanta of data.

The server digital twin auto-coding orchestrator 611 may create a digital twin of each of the one or more network nodes 613 using the two or more quanta of data.

The server digital twin auto-coding orchestrator 611 may automatically generate a proposed workflow to update the older version 615 to the updated version.

The server digital twin auto-coding orchestrator 611 may automatically generate machine-readable code to implement the proposed workflow.

The server digital twin auto-coding orchestrator 611 may test the proposed workflow and the machine-readable code on the digital twin.

The server digital twin auto-coding orchestrator 611 may revise the proposed workflow and machine-readable code based on the test, generating a revised workflow and revised machine-readable code.

Thus, apparatus and methods to automatically create and implement update and migration workflows are provided. Persons skilled in the art will appreciate that the present invention can be practiced by other than the described embodiments, which are presented for purposes of illustration rather than of limitation.

What is claimed is:

1. A digital twin auto-coding orchestrator computer program product, the computer program product comprising executable instructions, the executable instructions when executed by a processor on a computer system:
   receive an updated version of a software program, wherein an older version of the software program is installed on the computer system;
   gather two or more quanta of data from the computer system, wherein the data comprises infrastructure data and older version data;
   record the two or more quanta of data in a database;
   analyze the two or more quanta of data;
   create a digital twin of the computer system using the two or more quanta of data;
   automatically generate a proposed workflow to update the older version to the updated version;
   automatically generate machine-readable code to implement the proposed workflow;
   test the proposed workflow and the machine-readable code on the digital twin; and
   revise the proposed workflow and machine-readable code based on the test;
   wherein:
   the infrastructure data comprises:
      hardware data including performance, volume, and load capacity; and
      data on all software installed on the computer system, including performance data, memory utilization, processor utilization, and process runtimes;
   older version data comprises:
      version history;
      performance data;
      memory utilization;
      processor utilization; and
      process runtime; and
   the proposed workflow comprises one or more discrete tasks to install the updated version in a set order to minimize downtime and disruption.

2. The digital twin auto-coding orchestrator computer program product of claim 1 wherein the computer system is on a network.

3. The digital twin auto-coding orchestrator computer program product of claim 2 wherein the executable instructions further search the network for one or more additional computer systems where the older version of the software program is installed on the additional computer systems.

4. The digital twin auto-coding orchestrator computer program product of claim 3 wherein when the one or more additional computer systems are discovered, the instructions install a copy of the digital twin auto-coding orchestrator computer program product on each additional computer system, creating an original digital twin and one or more copied digital twins.

5. The digital twin auto-coding orchestrator computer program product of claim 4 wherein when the instructions install the one or more copied digital twins, each copy records two or more quanta of data in the database.

6. The digital twin auto-coding orchestrator computer program product of claim 5 wherein the original digital twin analyzes all data in the database.

7. The digital twin auto-coding orchestrator computer program product of claim 5 wherein the proposed workflow minimizes downtime and disruption for:
   a) the computer system;
   b) the network; and
   c) the one or more additional computer systems.

8. The digital twin auto-coding orchestrator computer program product of claim 1 wherein the analysis uses one or more artificial intelligence/machine learning ("AI/ML") algorithms.

9. The digital twin auto-coding orchestrator computer program product of claim 1 wherein the proposed workflow is generated by one or more artificial intelligence/machine learning ("AI/ML") algorithms.

10. The digital twin auto-coding orchestrator computer program product of claim 1 wherein the machine-readable code is generated by one or more artificial intelligence/machine learning ("AI/ML") algorithms.

11. The digital twin auto-coding orchestrator computer program product of claim 1 wherein the instructions implement the proposed workflow.

12. The digital twin auto-coding orchestrator computer program product of claim 1 wherein the instructions implement the proposed workflow using the machine-readable code.

13. An apparatus for a digital twin auto-coding orchestrator, the apparatus comprising:
a central server, the central server including:
a server communication link;
a server processor; and
a server non-transitory memory configured to store at least:
a server operating system; and
a server digital twin auto-coding orchestrator application; and
one or more network nodes, each network node comprising:
a node communication link;
a node processor; and
a node non-transitory memory configured to store at least:
a node operating system; and
an older version of a software program;
wherein when the server digital twin auto-coding orchestrator receives an updated version of the software program, the server digital twin auto-coding orchestrator:
identifies each of the one or more network nodes;
gathers two or more quanta of data from each of the one or more network nodes, wherein the data comprises infrastructure data and older version data;
records the two or more quanta of data in a database;
analyzes the two or more quanta of data;
creates a digital twin of each of the one or more network nodes using the two or more quanta of data;
automatically generates a proposed workflow to update the older version to the updated version;
automatically generates machine-readable code to implement the proposed workflow;
tests the proposed workflow and the machine-readable code on the digital twin; and
revises the proposed workflow and machine-readable code based on the test, generating a revised workflow and revised machine-readable code.

14. The apparatus of claim 13 wherein the digital twin auto-coding orchestrator implements the revised workflow.

15. The apparatus of claim 13 wherein the digital twin auto-coding orchestrator implements the revised workflow using the revised machine-readable code.

16. The apparatus of claim 13 wherein the digital twin auto-coding orchestrator transmits the revised workflow and the revised machine-readable code to a system administrator.

17. The apparatus of claim 13 wherein the digital twin auto-coding orchestrator revises the proposed workflow to a pre-determined condition.

18. The apparatus of claim 13 wherein the digital twin auto-coding orchestrator revises the machine-readable code to a pre-determined condition.

19. The apparatus of claim 13 wherein the digital twin auto-coding orchestrator automatically updates the older version of the software program to the updated version on each of the one or more nodes.

20. A method for updating a software program using a digital twin auto-coding orchestrator, the method comprising the steps of:
receiving, at the digital twin auto-coding orchestrator, an updated version of the software program;
querying each node of a network to determine which one or more nodes comprise an older version of the software program;
identifying which node of the one or more network nodes comprises an older version of the software program;
gathering two or more quanta of data from each node of the one or more network nodes comprising an older version of the software program, wherein the data comprises infrastructure data and older version data;
recording the two or more quanta of data in a database;
analyzing the two or more quanta of data;
creating a digital twin of each node of the one or more network nodes comprising an older version of the software program using the two or more quanta of data;
automatically generating a proposed workflow to update the older version to the updated version;
automatically generating machine-readable code to implement the proposed workflow;
testing the proposed workflow and the machine-readable code on the digital twin; and
revising the proposed workflow and machine-readable code based on the test, to generate a revised workflow and revised machine-readable code.

* * * * *